United States Patent [19]
Flower

[11] 3,878,637
[45] Apr. 22, 1975

[54] QUICK CHANGE FISHHOOK
[76] Inventor: Alva E. Flower, 603 S. 14th Ave., Bozeman, Mont. 59715
[22] Filed: Apr. 26, 1974
[21] Appl. No.: 464,643

[52] U.S. Cl. ............................................. 43/44.83
[51] Int. Cl. ................................................ A01k 91/04
[58] Field of Search ............ 43/44.83, 44.84, 44.85, 43/43.16, 42.49

[56] References Cited
UNITED STATES PATENTS

| | | | |
|---|---|---|---|
| 86,154 | 1/1869 | Hiltz | 43/44.83 |
| 2,843,964 | 7/1958 | Smith | 43/44.83 |
| 2,926,454 | 3/1960 | Gottman | 43/44.83 |
| 3,724,116 | 4/1973 | Lindner et al. | 43/44.83 |

*Primary Examiner*—Warner H. Camp
*Attorney, Agent, or Firm*—Karl W. Flocks

[57] ABSTRACT

A fishhook having a double C-shaped configuration attached at one end of the C at the line attaching end to trap a knot at the end of a fishline in a slot formed thereby.

6 Claims, 6 Drawing Figures

PATENTED APR 22 1975 3,878,637
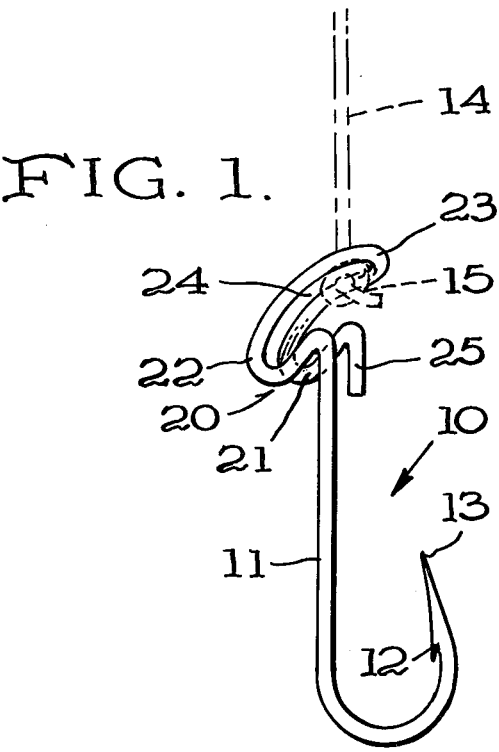
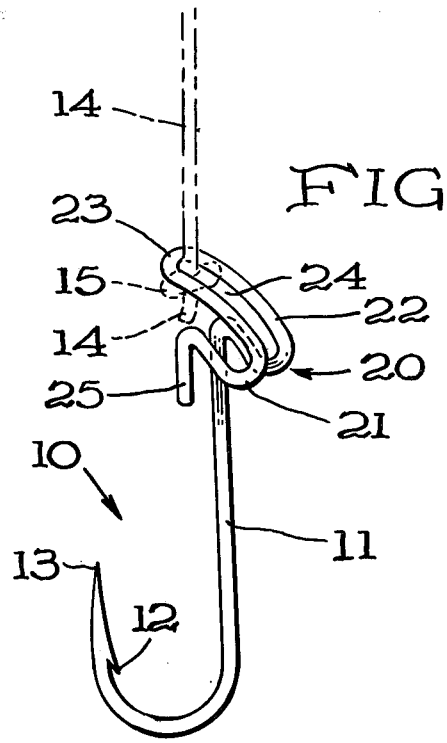
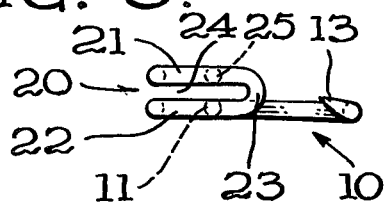
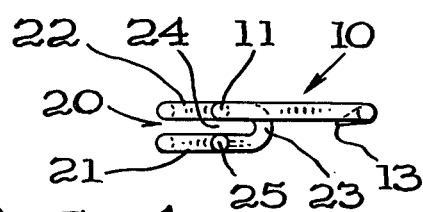
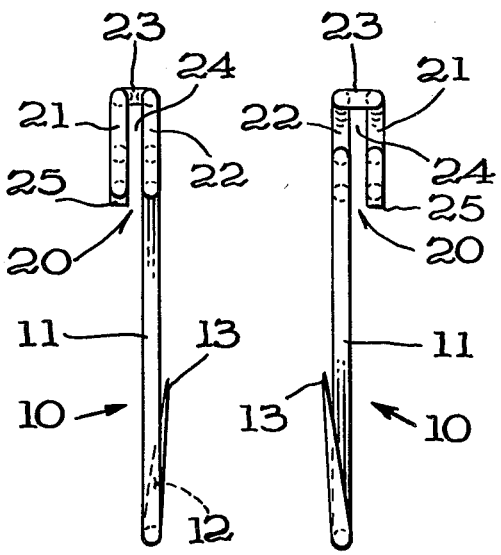

QUICK CHANGE FISHHOOK

BACKGROUND OF THE INVENTION

The present invention deals with a fishhook and more particularly with a fishhook having the eye of the prior art hooks replaced by a slotted shank trapping the knotted end of a line or leader, and with a safety trap to prevent accidental detachment.

Prior art fishhooks use the age-old eye or have used slots or slots in combination with eyes to attempt to obtain a quick change attachment of a fishhook.

A quick change fishhook may be particularly attractive for use in dry-fly fishing when frequent changing of hooks is required to keep the flys dry and floating.

Also, quick change hooks of reliable design are useful for general fishing to facilitate attachment and changing of bait hooks and lures when cold or darkness interferes with threading and tying manipulations as required with eyed shanks.

SUMMARY OF THE INVENTION

It is an object of the present invention to provide a fishhook of the type allowing convenient quick attachment or detachment of the hook from the line or leader while retaining reliability of attachment to prevent the knotted line or leader from becoming accidentally detached.

The present invention has a slotted end shaped to trap the knotted end of a line or leader to prevent unintentional detachment.

Accordingly the present invention is a fishhook having a double C-shaped configuration with connection at one end of the C on the end of the shank of the fishhook.

BRIEF DESCRIPTION OF THE DRAWINGS

Other objects and advantages will become apparent from the following description, reference being had to the accompanying drawings wherein:

FIG. 1 is an elevational perspective view of the fishhook of the present invention;

FIG. 2 is an elevational perspective view of the fishhook of FIG. 1 shown from the opposite side;

FIG. 3 is a top plan view of the fishhook of FIG. 1;

FIG. 4 is a bottom plan view of the fishhook of FIG. 1; and

FIGS. 5 and 6 are back and front elevational views, respectively, of the fishhook of the present invention.

DESCRIPTION OF THE PREFERRED EMBODIMENT

Referring to the figures, there are shown opposite side views of the fishhook of the present invention.

A fishhook 10 having a regular type shank 11, barb 12 and point 13 is attached to line or leader 14.

A C-shaped trap 20 is formed of two C-shaped wire forms 21 and 22 connected at one end by connecting piece 23 so as to place the C-shaped wire forms 21 and 22 side-by-side forming slot 24 therebetween. The opposite end of C-shaped wire form 22 from that connected to wire form 21, is connected to shank 11 so as to form somewhat of an over-all S-shape of the wire form 22 and the portion at that end of shank 11 attached thereto.

Line 14 has a knot 15 in its end with knot 15 shown in the figures as positioned in C-shaped trap 20 with the line extending through slot 24. Knotted line 14 is thus positioned to be firmly seated in the slot 24.

The construction and shape of C-shaped trap 20 is such that if a fish on the hook flops over backward on a tight line or if probing with a still threaded fish pole is required to dislodge a fly-hook from a tree or bush, accidental detachment of hook 10 from line 14 is prevented. This can be illustrated if line 14 is considered as having its upper end moved in a counterclockwise direction in FIG. 1 (clockwise direction in FIG. 2). The knot 15 will be moved toward the center curved portion of the C-shaped trap 20 but will be in no danger of allowing line 14 to disengage itself from slot 24. Thus can be illustrated the reliability of the attachment. In addition, the terminal end of the wire forming the C-trap, specifically the free end of wire form 21, is bent sharply to point end portion 25 downward towards the hook in a direction parallel to shank 11. This forms a second safety trap to retain knot 15 of line 14 in slot 24 and further increase the reliability of the attachment.

Quick attachment of knotted line 14 is made to hook 10 merely by placing the knot 15 in the C-shaped trap 20 with line 14 extending between C-shaped wire forms 21,22 at the open or lower end of trap 20 and entering line 14 into slot 24 through this open end between shank 11 and end portion 25. Line 14 is then set to hook 10 by rotating taut line 14 along slot 24 (clockwise in FIG. 1, counterclockwise in FIG. 2) until it reaches the connecting piece 23 as shown in the figures.

Removal of the line 14 from its attachment to hook 10 is quickly accomplished by rotating a taut line 14 along slot 24 opposite from the direction for attachment so that line 14 passes out of slot 24 at its open end and knot 15 is pulled out of C-shaped trap 20.

In this manner, there is quick and easy attachment and detachment of hook and line while at the same time reliability in prevention of accidental detachment.

It will be obvious to those skilled in the art that various changes may be made without departing from the scope of the invention and the invention is not to be considered limited to what is shown in the drawings and described in the specification.

What is claimed is:

1. A hook, for connection to a line with a knot near its end, comprising
    a shank with a hooked end on one end thereof,
    and a C-shaped structure with a slot therein on the opposite end of said shank to hold the knot within said structure with the line passing through said slot
    said C-shaped structure including
        a pair of C-shaped wire forms located adjacent each other and connected together at one end forming said slot between them which is closed at the connected end and open at the other end,
        said pair of C-shaped wire forms shaped so as to have their closed end at the farthest distance from said hooked end of said shank whereby the knot slidable in said slot moves toward the closed end of said slot under tension of the line when pulled in a direction away from said hooked end.

2. The hook of claim 1, further characterized by the C of said C-shaped structure opening to the same side as the opening of said hooked end.

3. The hook of claim 2, further characterized by said slot opening to the same side as the opening of said hooked end.

4. The hook of claim 1, further characterized by one of said pair of C-shaped wire forms having its end at the open end of said slot connected to said shank.

5. The hook of claim 4, further characterized by the connection of said C-shaped wire form with said shank being also a C-shape including the ends of said shank and said wire form connected to said shank.

6. The hook of claim 4, further characterized by the connection of said C-shaped wire form with said shank having a bend therein opening in a direction substantially opposite to that of the C of said C-shaped structure, the terminal end of said C-shaped structure, on the unconnected end of said other C-shaped wire form than said aforementioned one connected to said shank, having an end portion extending substantially parallel to said shank.

* * * * *